G. F. J. COLBURN.

Hot Air Register.

No. 1,165. Reissued April 2, 1861.

Witnesses
C N Courtau
James Land

Inventor
G. F. J. Colburn

N. PETERS, Photo-Lithographer, Washington, D. C.

UNITED STATES PATENT OFFICE.

G. F. J. COLBURN, OF NEWARK, NEW JERSEY.

IMPROVED EVAPORATOR FOR HOT-AIR PIPES.

Specification forming part of Letters Patent No. 31,152 dated January 22, 1861; Reissue No. 1,165, dated April 2, 1861.

*To all whom it may concern:*

Be it known that I, G. F. J. COLBURN, of Newark, in the county of Essex and State of New Jersey, have invented a new and Improved Evaporator for Hot-Air Pipes; and I do hereby declare that the following is a full, clear, and exact description of the same, reference being had to the accompanying drawings, forming part of this speification, in which—

Figure 1:
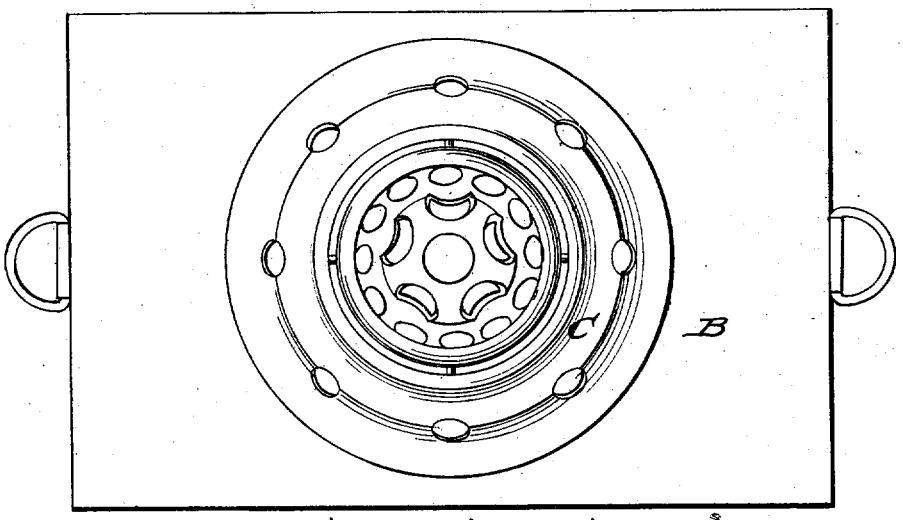
Figure 2:
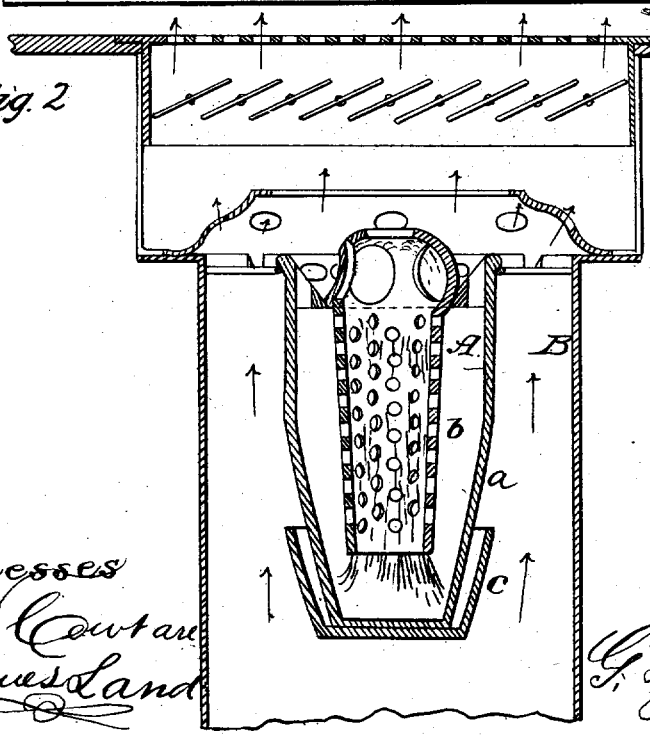
Figure 3:
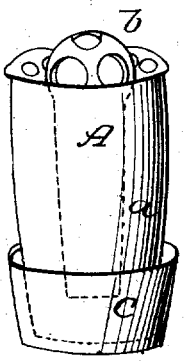

Figure 1 represents a plan or top view of my invention. Fig. 2 is a vertical central section of the same. Fig. 3 is a perspective view of the evaporating-vessel detached.

Similar letters of reference in the three figures indicate corresponding parts.

The air which emanates from hot-air pipes has an injurious influence on the health, because it is capable of absorbing some moisture which it takes from those bodies with which it is brought in contact. Furthermore, when the register is closed the wood-work in the neighborhood of the hot-air pipes is liable to become overheated, which is the cause of a great many conflagrations. Besides this difficulty, a large quantity of dust and ashes finds its way up through the hot-air pipes and through the register into the apartment to be heated by the air. To overcome the first of these difficulties, it has been proposed to place a vessel containing water between the jambs of the register itself, so that the air is saturated with moisture before it is allowed to pass into the room. This arrangement, however, has been found insufficient, because the surface of the evaporating-vessel is not sufficiently exposed to the current of hot air to effect the evaporation quick enough to be of any account, and if the register is closed the evaporation stops and the effect of the heated air on the wood-work surrounding the hot-air pipes is not at all counteracted. Guided by these observations, I have placed my evaporating-vessel into the mouth of the hot-air pipe, where it is completely surrounded by the current of hot air, and where, when the register is closed, the moisture evaporating from said vessel comes in contact with the surrounding wood-work and prevents conflagrations. A reflector arranged over the evaporating-vessel has the double purpose of throwing the heat down upon the evaporating surface, thereby facilitating the evaporation and of throwing the dust and ashes which rise in the hot-air pipe back into the furnace or on the evaporating-vessel itself, from which it can easily be removed whenever it is found necessary. A portion of the evaporating-vessel is made of some porous material—such as unglazed earthenware—in such a manner that a portion of the water percolates through the porous sides of the vessel, where the same, by coming in contact with the current of hot air, is readily evaporated, and at the same time by keeping the sides of the vessel moist they are rendered capable of retaining much of the dust which rises in the hot-air pipe. Furthermore, the evaporating-vessel is furnished with an inner perforated vessel containing a lamp-wick or other piece of fibrous or textile material, and extending down into the water in such a manner that by the capillary attraction of said fibrous material, which causes the moisture to rise constantly to the surface, the evaporation is considerably facilitated.

To enable those skilled in the art to make and use my invention, I will proceed to describe its construction and operation with reference to the drawings.

The evaporating-vessel A is placed in the mouth of the hot-air pipe B, and near to the register, which is shown in red outlines in Fig. 2. The moisture which arises from this vessel finds its way through the jambs of the register into the apartment when the register is open; but when the register is closed it comes in contact with the wood-work surrounding the hot-air pipe and the register, and prevents those parts becoming overheated. A reflector, C, is placed over the vessel A, partly for the purpose of facilitating the evaporation and partly for the purpose of preventing the dust which rises with the current of hot air from finding its way into the apartment. In striking the reflector the dust is thrown back into the hot-air pipe.

The vessel A which I use is composed of two parts, *a* and *b*. The outer part or shell, *a*, is made of some porous material—such as unglazed earthenware—which allows the percolation of the water contained in the vessel, and it sets in a cup, *c*, of glazed earthenware or some other material capable of holding water. The object of this cup is to catch the water which would otherwise be liable to drip down from the porous sides of the vessel upon the furnace. I do not confine myself, however, to the precise shape of the vessel shown in the drawings, since it may be constructed in various shapes, according to circumstances and to the position which said vessel is to occupy in relation to the register. At the same time a large portion of the dust rising in the hot-air pipe is retained by the moist sides of this vessel. The inner part, *b*, of the evaporating-vessel A consists of a perforated tube with a globe-shaped head, and it serves to receive a lamp-wick or other piece of fibrous or textile material capable of raising the moisture by capillary attraction. The water contained in the vessel A is thus brought constantly up to the surface, where it is exposed to the heat thrown down by the reflector, so that it readily evaporates. The shape of this inner part must of course be accommodated to the shape of the shell or outer part, *a*, and by thus combining the evaporating-power of the two vessels *a* and *b* the requisite quantity of moisture is taken up by the hot air to prevent its injurious influence to the health.

All the qualities of my evaporator combined render the same of considerable value for the insurance companies, because by its use many conflagrations are prevented, and also for the inmates of the house, because by its use a healthy and pure air is provided.

Having thus fully described my invention, what I claim as new, and desire to secure by Letters Patent, is—

1. The arrangement of the reflector C, in combination with the evaporating-vessel A and hot-air pipe B, as described, for the purpose of facilitating the evaporation, and to prevent the dust rising into the apartment.

2. Making the evaporating-vessel A or a portion of the same of unglazed earthenware or some other porous material, substantially as and for the purpose specified.

3. Constructing the vessel A of two parts, *a* and *b*, the part *a* to be made of porous material, and the part *b* to contain a lamp-wick or its equivalent, substantially as and for the purpose set forth.

G. F. J. COLBURN.

Witnesses:
O. D. MUNN,
JAMES LAIRD.